(12) United States Patent
Masuda

(10) Patent No.: US 12,498,046 B2
(45) Date of Patent: Dec. 16, 2025

(54) SPOOL VALVE

(71) Applicant: IHI Corporation, Tokyo (JP)

(72) Inventor: Seiei Masuda, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/404,026

(22) Filed: Jan. 4, 2024

(65) Prior Publication Data

US 2024/0142002 A1   May 2, 2024

Related U.S. Application Data

(63) Continuation of application No. PCT/JP2022/033992, filed on Sep. 12, 2022.

(30) Foreign Application Priority Data

Sep. 17, 2021   (JP) ................. 2021-152173

(51) Int. Cl.
*F16K 11/07*   (2006.01)
*F16K 3/26*   (2006.01)

(52) U.S. Cl.
CPC ............ *F16K 3/26* (2013.01); *F16K 11/0716* (2013.01)

(58) Field of Classification Search
CPC ..... F16K 3/26; F16K 11/0716; F16K 11/0708
See application file for complete search history.

(56) References Cited

U.S. PATENT DOCUMENTS

| | | | |
|---|---|---|---|
| 4,667,930 A * | 5/1987 | Latimer | ................. F15B 13/04 |
| | | | 251/324 |
| 2004/0138025 A1 | 7/2004 | Yamaguchi et al. | |
| 2009/0057594 A1* | 3/2009 | Tsujimoto | ........... F16K 31/0613 |
| | | | 251/324 |
| 2015/0252908 A1 | 9/2015 | Nagasaki et al. | |

FOREIGN PATENT DOCUMENTS

| | | |
|---|---|---|
| JP | S50-20242 U | 3/1975 |
| JP | 50-150832 U | 12/1975 |
| JP | 3-374 U | 1/1991 |
| JP | 2004-150535 A | 5/2004 |
| JP | 2015-169212 A | 9/2015 |

OTHER PUBLICATIONS

International Search Report issued Oct. 11, 2022 in PCT/JP2022/033992 filed on Sep. 12, 2022, 2 pages.
Extended European Search Report dated Jul. 3, 2025, issued in European patent application No. 22869923.7.

* cited by examiner

*Primary Examiner* — Kelsey E Cary
(74) *Attorney, Agent, or Firm* — Oblon, McClelland, Maier & Neustadt, L.L.P.

(57) ABSTRACT

A spool valve includes: a sleeve extending in an axial direction thereof, including inlet and outlet ports for working fluid; a spool housed in the sleeve; a biasing device that presses a base end of the spool toward a tip end of the spool; and a pressure detecting port opening toward the tip end. The spool includes: first and second land sections; a groove section located between the first land section and the second land section, having a width in the axial direction to connect between the inlet port and outlet port; a recess portion formed on an outer peripheral surface of the second land section; and a connection passage for the working fluid formed in the second land section, connecting between the (Continued)

groove section and the recess portion. A path hole is formed in the sleeve facing the recess portion of the spool.

4 Claims, 5 Drawing Sheets

SPOOL VALVE

CROSS REFERENCE TO RELATED APPLICATIONS

This application is a continuation application of International Application No. PCT/JP2022/033992, now WO 2023/042776 A1, filed on Sep. 12, 2022, which claims priority to Japanese Patent Application No. 2021-152173, filed on Sep. 17, 2021, the entire contents of which are incorporated by reference herein.

TECHNICAL FIELD

The present disclosure relates to a spool valve.

BACKGROUND

The spool valve has a sleeve and a spool housed in the sleeve. The spool valve is a valve that opens and closes a flow passage by moving the spool. The sleeve is provided with a housing hole for the spool. An inlet port and an outlet port for working fluid is provided on the side surface of the sleeve. The spool has a land section (a large-diameter portion) having an outer diameter approximately equal to the diameter of the housing hole of the sleeve, and a groove section (small-diameter portion) recessed radially inward from the outer peripheral surface of the land section. The groove section has a width capable of connecting between the inlet port and the outlet port. The opening degree of the spool valve is adjusted depending on the position of the groove section in accordance with the movement of the spool.

When the spool valve is in an open state, the working fluid flows into the inlet port and is discharged from the outlet port through the groove section. Forces due to the flow of the working fluid act on the inner surface of the groove section near the inlet port and the outlet port. For example, when either the inlet port or the outlet port is throttled by the spool (in other words, if it is slightly open), a jet of the working fluid generated. If a pressure fluctuation caused by the jet breaks the balance between the aforementioned forces on an inlet port side and an outlet port side as described above, the spool generates forces in the axial and radial directions, respectively. These forces are generally referred to as flow forces (or fluid forces). Because the axial flow force acts in the direction of closing the valve, when the valve is open at a small opening degree, the working fluid tends to pulsate and the pressure control is likely to unstable. In this regard, JP 2015-169212 A discloses a spool type pressure control valve for suppressing this pulsation.

SUMMARY OF THE INVENTION

It is desirable that the pressure control valve and the flow control valve can ideally control the pressure of the working fluid at a constant level with respect to an increase or decrease in the flow rate of the working fluid. However, these valves have a so-called override property in which the pressure of the working fluid increases with an increase in the flow rate of the working fluid. The above-mentioned flow forces also affect this override property. For example, when the flow force increases, the ratio of the pressure change of the working fluid to the flow change of the working fluid increases, and it becomes difficult to control the pressure or flow rate.

An object of the present disclosure is to provide a spool valve capable of suppressing the influence of the flow force on the override property and being applied to a pressure control valve or a flow control valve.

A spool valve according to an aspect of the present disclosure includes: a sleeve extending in an axial direction thereof, including an inlet port and an outlet port for working fluid; a spool movably housed in the sleeve in the axial direction; a biasing device including a biasing member configured to press a base end of the spool toward a tip end of the spool; and a pressure detecting port opening toward the tip end of the spool; wherein the spool includes: a first land section located between the pressure detecting port and the inlet port in the axial direction; a second land section located at a position where the outlet port can be closed; a groove section located between the first land section and the second land section, having a width in the axial direction capable of connecting between the inlet port and outlet port; a recess portion formed on an outer peripheral surface of the second land section; and a connection passage for the working fluid formed in the second land section, connecting between the groove section and the recess portion, and the sleeve is formed with a path hole facing the recess portion of the spool.

According to the present disclosure, it is possible to provide a spool valve capable of suppressing the influence of the flow force on the override property and being applied to a pressure control valve or a flow control valve.

BRIEF DESCRIPTION OF DRAWINGS

FIGS. 4A and 4B are cross-sectional views of the spool valve, wherein FIG. 4A is a cross-sectional view along the line IVA-IVA in FIG. 2, and FIG. 4B is a cross-sectional view along the line IVB-IVB in FIG. 2.

FIGS. 5A and 5B are plan views showing several examples of outlet ports as viewed from the radial direction, wherein FIG. 5A shows a first example of an outlet port, and FIG. 5B shows a second example of an outlet port.

FIGS. 6A and 6B are diagrams showing numerical analysis results using Computational Fluid Dynamics (CFD) for the static pressure distribution in a groove section near an outlet port on a cross section orthogonal to an axis, wherein FIG. 6A shows the static pressure distribution in the comparative example, and FIG. 6B shows the static pressure distribution in the present embodiment.

FIGS. 7A and 7B are diagrams showing numerical analysis results using CFD for the velocity distribution of a jet on a cross section including an axis, wherein FIG. 7A shows a velocity distribution of a jet in the comparative example, and FIG. 7B shows a velocity distribution of a jet in the present embodiment.

DESCRIPTION OF EMBODIMENTS

Figure 1:
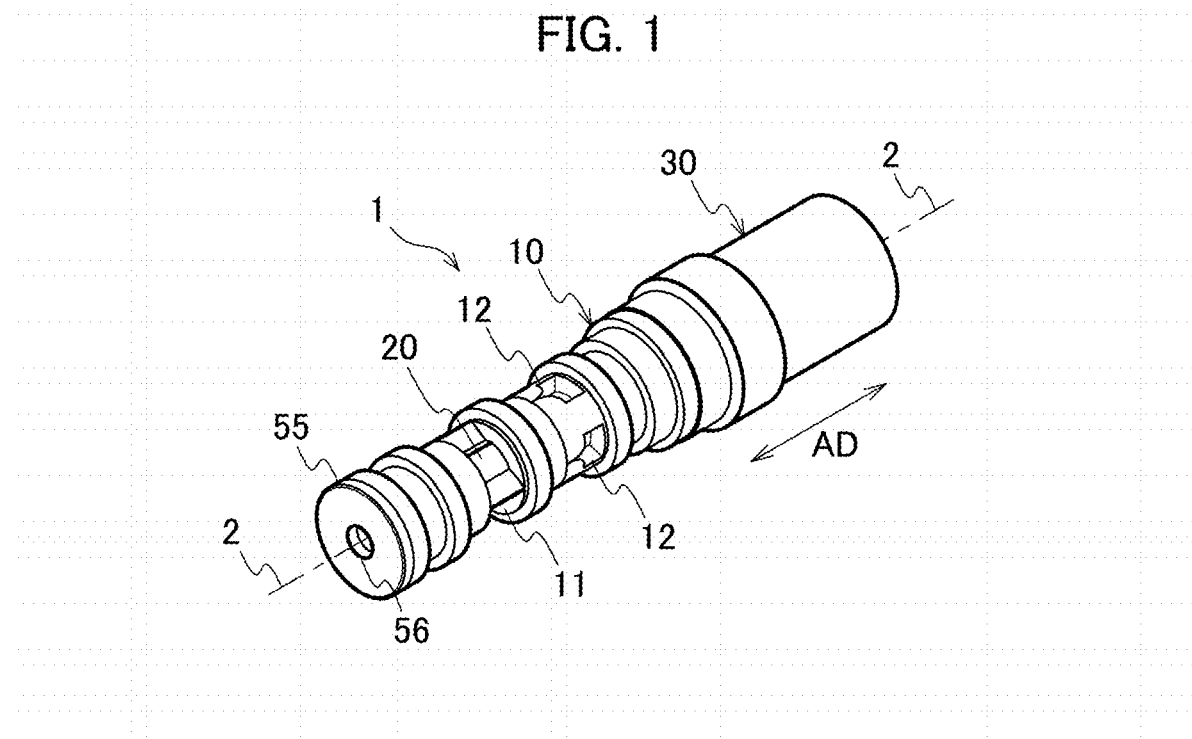
FIG. 1 is a perspective view of a spool valve according to an embodiment of the present disclosure.

Hereinafter, some embodiments of the present disclosure will be described. The same reference numerals will be used for common parts in each figure, and duplicate descriptions will be omitted. The spool valve according to the present embodiment can be applied as a pressure control valve or a flow control valve in an environment in which electric control is difficult, such as an aircraft fuel supply system, for example.

Figure 2:
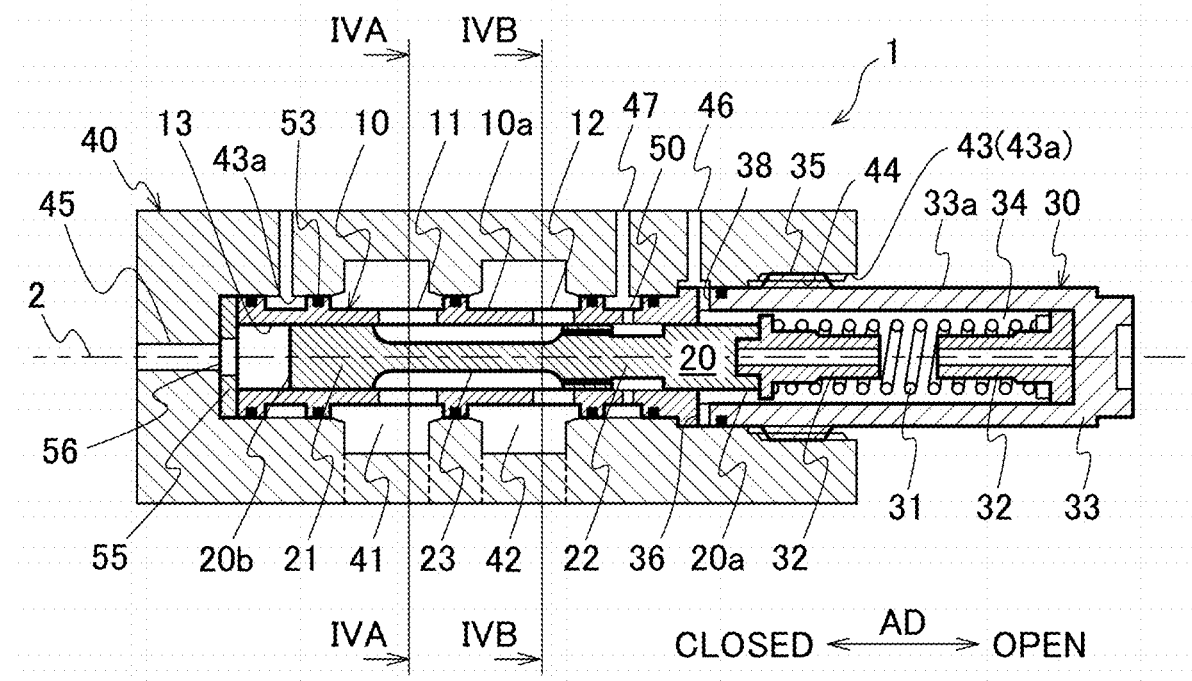
FIG. 2 is a cross-sectional view of the spool valve, the view including an axis.
Figure 3:
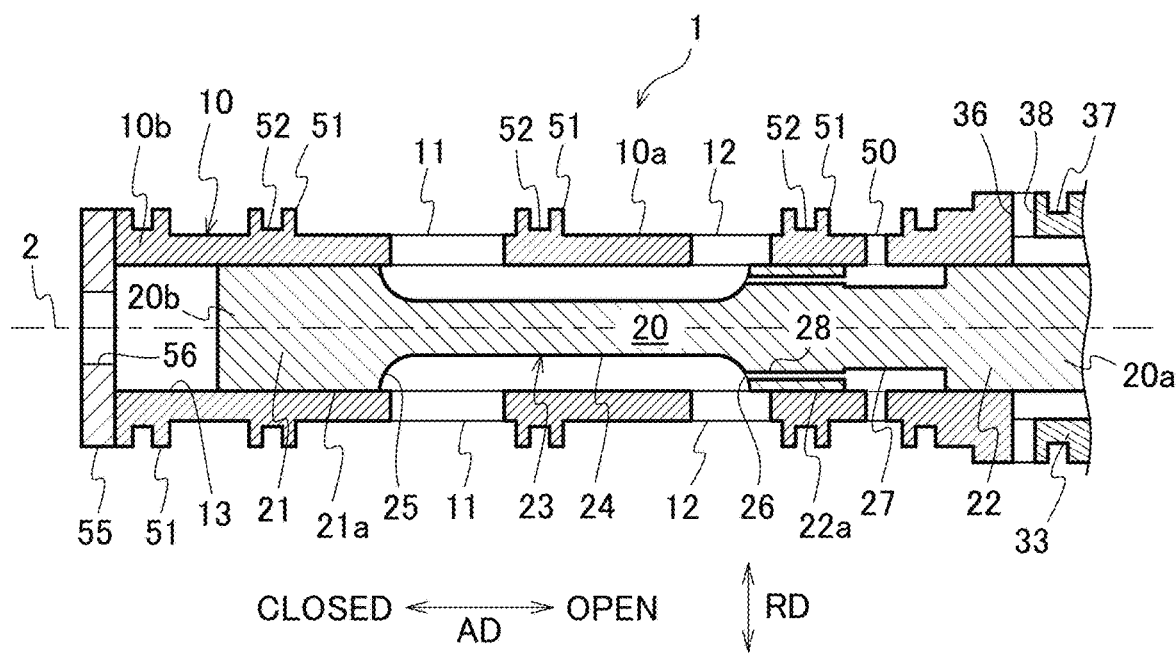
FIG. 3 is an enlarged cross-sectional view around a groove section of the spool shown in FIG. 2.
Figure 4A:
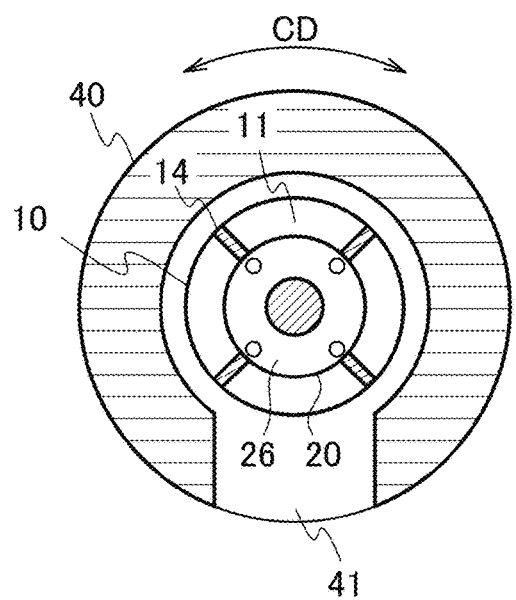
Figure 4B:
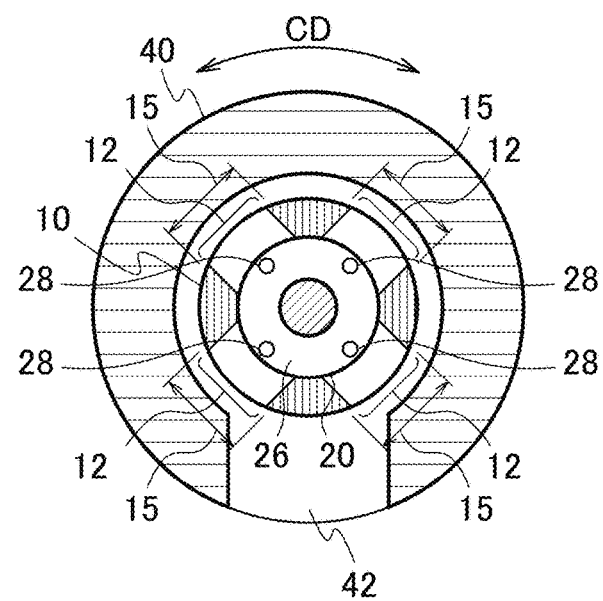

A spool valve 1 according to the present embodiment will be described below. FIG. 1 is a perspective view of the spool valve 1. FIG. 2 is a cross-sectional view of the spool valve 1, the view including an axis 2. FIG. 3 is an enlarged cross-sectional view around a groove section 23 of a spool 20 shown in FIG. 2. FIGS. 4A and 4B are cross-sectional views of the spool valve 1, wherein FIG. 4A is a cross-sectional view along the line IVA-IVA in FIG. 2, and FIG. 4B is a cross-sectional view along the line IVB-IVB in FIG. 2.

For convenience of explanation, an extending direction of the axis 2 is referred to as an axial direction AD, and a circumferential direction and a radial direction around the axis 2 as the center are referred to as a circumferential direction CD and a radial direction RD, respectively. The axis 2 is a central axis of a sleeve 10 (described later) and a spool 20 (described later). A direction in which the spool 20 opens the outlet port 12 of the sleeve 10 (the right direction in FIG. 2) is called an opening direction, and a direction in which the spool 20 closes the outlet port 12 of the sleeve 10 (the left direction in FIG. 2) is called a closing direction. Both the opening direction and the closing direction are parallel to the axial direction AD.

As shown in FIG. 1, the spool valve 1 according to the present embodiment has a substantially cylindrical outer shape extending in the axial direction AD. The spool valve 1 includes a sleeve 10, a spool (piston) 20, and a biasing device 30. As shown in FIG. 2, for example, the spool valve 1 is inserted into a mounting hole 43 formed in a housing 40, and is attached to the housing 40.

First, the sleeve 10 will be described.

The sleeve 10 is a hollow cylindrical member extending in the axial direction AD. The spool 20 is movably housed in the housing hole 13 in the axial direction AD. The housing hole 13 is formed in the sleeve 10 and extends in the axial direction AD around the axis 2 as the center.

An inlet port 11 and an outlet port 12 are provided on the outer peripheral surface 10a of the sleeve 10. The inlet port 11 is an inlet for the working fluid. The inlet port 11 connects with an inlet passage 41 formed in the housing 40. As shown in FIG. 4A, the inlet port 11 has a predetermined width in the axial direction AD and is formed over the entire circumferential direction CD except where the ribs 14 are provided. The inlet port 11 is always connected with a groove section 23 of the spool 20.

The outlet port 12 is located between the inlet port 11 and a base end 20a of the spool 20. The outlet port 12 is an outlet for the working fluid. The outlet port 12 connects with an outlet passage 42 formed in the housing 40. As shown in FIG. 4B, the outlet port 12 is formed in regions 15 (see FIGS. 5A and 5B) arranged at intervals in the circumferential direction CD. Each region 15 defines the outer shape of the outlet port 12. The regions 15 are located at same intervals (e.g., every 90 degrees around the axis 2) along, for example, the circumferential CD.

The outlet port 12 will be described in detail.

Figure 5A:
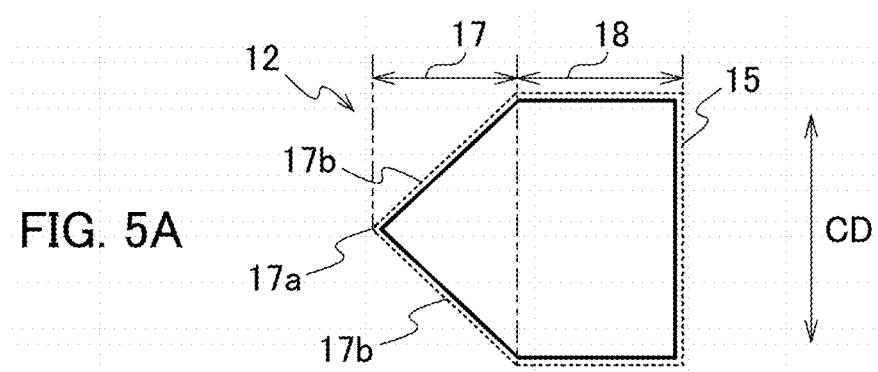
Figure 5B:
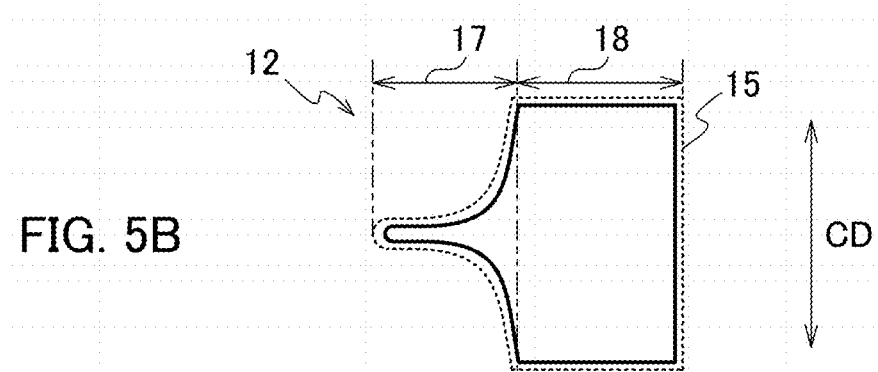

FIGS. 5A and 5B are plan views showing several examples of outlet ports 12 as viewed from the radial direction RD, wherein FIG. 5A shows a first example of an outlet port 12, and FIG. 5B shows a second example of an outlet port 12. As shown in these figures, the outlet port 12 is a single opening and is formed in regions 15 arranged at intervals in the circumferential direction CD. the outlet port 12 is sectioned into a first part (segment) 17 and a second part (segment) 18. The first part 17 is located closer to the inlet port 11 than the second part 18. The second part 18 is located farther from the inlet port 11 than the first part 17.

In the development planes of FIGS. 5A and 5B, the outer shape of the first part 17 has an isosceles triangle or a similar shape thereof with a vertex 17a facing the inlet port 11. That is, the width of the first part 17 along the circumferential CD increases as it approaches the second part 18. The rate of increase in the width along the circumferential CD may be constant as shown in FIG. 5A, or may increase according to an exponential function or a function with an increase rate similar to the exponential function as shown in FIG. 5B. In the latter case, the outer shape of the first part 17 is curved toward the first part 17 (i.e., toward the inside of the second part) on the two sides 17b and 17b forming the apex angle as compared with the triangular outer shape shown in FIG. 5A.

On the other hand, in the development planes shown in FIGS. 5A and 5B, the outer shape of the second part 18 is rectangular with sides extending in the axial direction AD and the circumferential direction CD, respectively. That is, the width of the first part 17 along the circumferential direction CD is constant.

For the sake of explanation, the region 15 of the outlet port 12 shown in FIGS. 5A and 5B is expanded outward from the region where the opening of the outlet port 12 is formed. However, actually, the opening of the outlet port 12 coincides with the region 15 of the outlet port 12.

The shape of the region 15 is not limited to the substantially pentagonal shape described above. That is, according to the specification of the spool valve 1, the region 15 may be constituted only of the first part 17 or only of the second part 18.

A path hole 50 is formed in the outer peripheral surface 10a of the sleeve 10. The path hole 50 extends in the radial direction RD and connects with a flow passage 47 formed in the housing 40. The path hole 50 also connects with the housing hole 13. Accordingly, the working fluid flows through the path hole 50 between the second land section 22 and the sleeve 10. The working fluid also flows through the same path hole (not shown) between the first land section 21 and the sleeve 10. By allowing the working fluid to flow into these gaps, the fluid from the inlet passage 41 into the gaps is prevented, and the spool 20 is prevented from sticking due to the inflow of potential contaminants.

The flow passage 47 is connected to the inlet passage 41 or a flow passage (not shown) connected to the inlet passage 41. The flow passage 47 is a flow passage in which cleanliness is maintained by a filter having a small pressure drop which is intentionally redundantly connected to the flow passage. Therefore, the pressure in the flow passage 47 is equal to the pressure in the inlet passage 41. The flow passage 47 may be connected to the outlet passage 42 or the flow passage (not shown) connected to the outlet passage 42. In this case, the fluid flowing through the flow passage 47 is relatively smaller in amount than the fluid flowing through the inlet passage 41 by the filter described above. Therefore, the pressure in the flow passage 47 is equal to the pressure in the outlet passage 42.

As shown in FIG. 3, protrusions 51 are provided on the outer peripheral surface 10a of the sleeve 10. Each protrusion 51 protrudes radially outward and is formed in an annular shape around the axis 2 as the center. The protrusion 51 has a groove 52 recessed inwardly in the radial direction RD. A seal member 53 such as an O-ring (see FIG. 2) is attached into the groove 52. When the spool valve 1 is inserted into the mounting hole 43, the seal member 53 is pressed against the inner peripheral surface 43a of the mounting hole 43 formed in the housing 40 due to its elastic deformation. Thereby, the space (clearance) between the sleeve 10 and the housing 40 is partitioned, and leakage of the working fluid having flowed into the partitioned space can be prevented. Further, the position of the sleeve 10 in the mounting hole 43 is stably maintained by the pressure contact of the seal member 53.

As shown in FIG. 3, the tip end portion 10b of the sleeve 10 is provided with a washer (lid member) 55. The washer 55 is a disk covering the housing hole 13, and a pressure detecting port 56 is formed in the center thereof. As shown in FIG. 1, the pressure detecting port 56 penetrates the washer 55 in the axial direction AD, and connects between the pressure detecting passage 45 and the housing hole 13. The washer 55 may be provided separately from the sleeve 10, or may be integrally formed with the sleeve 10 as a tip end surface of the sleeve 10 from a single base material. The pressure detecting passage 45 is connected to the inlet passage 41 or a flow passage (not shown) connected to the inlet passage 41. Therefore, the pressure in the pressure detecting passage 45 is equal to the pressure in the inlet passage 41.

Next, the spool 20 will be described.

The spool 20 is a rod-shaped member having a circular cross section. The spool 20 extends in the axial direction AD from a base end 20a thereof to a tip end 20b thereof. As shown in FIG. 1, the spool 20 is movably (reciprocatably) housed in the housing hole 13 in the axial direction AD, wherein the housing hole 13 is formed in the sleeve 10.

The spool 20 includes a first land section (large-diameter portion) 21, a second land section (large-diameter portion) 22, and a groove section (small-diameter portion) 23. The first land section 21 and the second land section 22 are arranged in the axial direction AD with the groove section 23 between them. The first land section 21 and the second land section 22 have outer diameters substantially equal to (i.e., slightly smaller than) the inner diameter of the housing hole 13. The first land section 21 is located between the pressure detecting port 56 (washer 55) and the inlet port 11 in the axial direction AD. On the other hand, the second land section 22 is located at a position where the outlet port 12 can be closed by the movement of the sleeve 10. Grooves (so-called labyrinth grooves) (not shown) are formed on the outer peripheral surface 21a of the first land section 21 and the outer peripheral surface 22a of the second land section 22 to prevent the hydraulic fluid from sticking (Hydraulic Lock).

The groove section 23 is located between the first land section 21 and the second land section 22. The groove section 23 is recessed radially inward from the outer peripheral surface of the spool 20, and extends over the entire circumferential direction CD. Therefore, the groove section 23 is formed in an annular shape centered on the axis 2. Further, the groove section 23 has a width in the axial direction AD that is capable of connecting the inlet port 11 and the outlet port 12, and forms a flow passage of the working fluid in the groove section 23.

The inner surface of the groove section (small-diameter portion) 23 includes a cylindrical surface (intermediate part) 24, a first annular surface (expanded-diameter part) 25, and a second annular surface (expanded-diameter part) 26. The cylindrical surface 24 has a constant diameter and extends in the axial direction AD around the axis 2 as the center.

The first annular surface 25 extends while curving from the cylindrical surface 24 toward the outer peripheral surface 21a of the first land section 21, and is connected to the outer peripheral surface 21a. The first annular surface 25 gradually deflects the flow of the working fluid, which has flowed into the groove section 23 from the inlet port 11, from the radial direction RD to the axial direction AD.

The second annular surface 26 extends while curving from the cylindrical surface 24 toward the outer peripheral surface 22a of the second land section 22, and is connected to the outer peripheral surface 22a. The second annular surface 26 gradually deflects the flow of the working fluid, which will flow out from the groove section 23 to the outlet port 12, from the axial direction AD to the radial direction RD. The continuous deflection by each annular surface suppresses the excessive impact of the working fluid against the groove section 23 and reduces the excessive pressure on the spool 20 caused by the impact.

As shown in FIG. 3, a recess portion 27 is formed on the outer peripheral surface 22a of the second land section 22. The recess portion 27 faces the path hole 50 and extends over the entire circumferential direction CD. Therefore, the recess portion 27 is formed in an annular shape centered on the axis 2. The recess portion 27 has a width in the axial direction AD that maintains a state where the recess portion 27 faces the path hole 50 regardless of the position of the spool 20.

Connection passages 28 are formed in the second land section 22. The connection passages 28 extend along the axial direction AD from the recess portion 27 to the groove section 23 as a hole having a circular cross section, for example, and connect between the groove section 23 and the recess portion 27. The connection passages 28 open to the second annular surface 26. As shown in FIG. 10, the connection passages 28 are evenly spaced in the circumferential direction CD (for example, every 90° around the axis 2). The number and angular spacing of the connection passages 28 can be set arbitrarily. The cross-sectional area of the connection passages 28 orthogonal to the extending direction thereof has a value sufficient to supply the working fluid from the recess portion 27 to the groove section 23 without excessive delay when the spool valve 1 is in the open state.

The groove section 23 moves in the axial direction AD with the movement of the spool 20. Depending on the position of the groove section 23, a connection between the inlet port 11 and the outlet port is made through the groove section 23, or the connection between the inlet port and the outlet port 12 is terminated. The flow rate of the working fluid is adjusted by changing the opening area of the groove section 23 relative to the outlet port 12.

Next, the biasing device 30 will be described.

The biasing device 30 biases the base end 20a of the spool 20 toward the tip end 20b (i.e., toward the closing direction of the valve). As shown in FIG. 2, the biasing device 30 includes a spring 31 as a biasing member, a pair of retainers 32 and 32, and an operation part (handle) 33. The spring 31 presses the base end 20a of the spool 20 toward the tip end 20b of the spool. The spring 31 is a so-called compression coil spring and has a spring coefficient that produces a predetermined range of biasing forces. The spring 31 is held from both sides of the axial direction AD by the pair of retainers 32 and 32 and is housed in the operation part 33.

The operation part 33 is a hollow and bottomed cylindrical member. The operation part 33 has a housing section 34 opening toward the spool 20. The housing section 34 houses the spring 31 and the pair of retainers 32 and 32. A screw thread 35 is formed on an outer peripheral surface 33a of the operation part 33. The screw thread 35 is screwed into a screw groove 44 formed on an inner peripheral surface 43a of the mounting hole 43. Accordingly, the operation part 33 moves in the axial direction AD by the rotation thereof about the axis 2. An annular groove 37 is formed in a part of the outer peripheral surface 33a of the operation part 33 between an edge portion 36 of the operation part 33 facing the spool 20 and the screw thread 35 (see FIG. 3). A seal member 53 is attached to the groove 37. When the operation part 33 is inserted into the mounting hole 43, the seal member 53 is pressed toward the inner peripheral surface 43a of the mounting hole 43. The elastic deformation of the pressed seal member 53 prevents leakage of the working fluid from between the outer peripheral surface 33a of the operation part 33 and the inner peripheral surface 43a of the mounting hole 43.

Regardless of the position of the operation part 33, the housing section 34 of the operation part 33 connects with a drain flow passage 46. The drain flow passage 46 is connected to the outlet passage 42 or the flow passage (not shown) connected to the outlet passage 42, through an orifice (not shown). Accordingly, the pressure in the housing section 34 slowly changes to maintain equilibrium with the pressure in the outlet passage 42. A groove (notch) 38 may be formed at the edge portion 36 of the operation part 33. With the formation of the groove 38, even when the edge portion 36 of the operation part 33 comes into contact with the spool 20, connection between the drain flow passage 46 and the housing section 34 is maintained.

By rotating the operation part 33, the operation part 33 approaches the sleeve 10 or leaves from the sleeve 10. When the operation part 33 is brought close to the sleeve 10, the spring 31 contracts, and the biasing force of the spring 31 and the pressure in the operation part 33 are transmitted to the spool 20 through the retainer 32. Accordingly, it is possible to adjust the pressure in the spool valve 1 by adjusting the rotation number of the operation part 33. In the present embodiment, the pressure can be set only by the mechanical operation which is only the rotation of the operation part 33. That is, the electric control using a solenoid or the like is unnecessary.

Next, the operation of the spool valve 1 will be described. The operation of the spool valve 1 according to the present embodiment as a pressure control valve or a flow control valve is basically the same as that of a conventional pressure control valve or a flow control valve equipped with a spool. That is, the position of the spool 20 is determined according to the difference between the pressure applied to the spool 20 by the biasing device 30 and the pressure of the working fluid in the pressure detecting port 56, and the opening area (opening degree) of the outlet port 12 is determined according to the position thus determined.

When the flow rate of the working fluid flowing out from the outlet port 12 increases, the contraction of the spring 31 increases, and the biasing force in the flow rate also increases. The flow force due to the jet at the outlet port 12 also increases in accordance with the increase of the flow rate. Therefore, when the spool valve 1 is in the open state, the pressure of the working fluid increases as the flow rate increases (override property). However, when the spool valve 1 functions as a pressure control valve or a flow rate control valve, it is desirable for the spool valve 1 to be able to control the pressure of the working fluid at a constant level as the flow rate increases or decreases.

Therefore, in this embodiment, connection passages 28 are formed in the second land section 22 to connect between the groove section 23 and the recess portion 27. A flow passage 47 (see FIG. 2) in the housing 40 connecting with the path hole 50 is connected to the inlet passage 41 or a flow passage (not shown) connected to the inlet passage 41. Therefore, the pressures in the recess portion 27 and the connection passage 28 are both equal to the pressure in the inlet passage 41. In addition, the groove section 23 always connects with the inlet passage 41 through the inlet port 11. Therefore, when the spool valve 1 is closed, since there is no flow of the working fluid, the pressure in the groove section 23 and the pressure in the connection passage 28 are equal to each other.

When the spool valve 1 is open, a jet of the working fluid is generated in the vicinity of the outlet port 12. Accordingly, the static pressure around the second annular surface 26 of the groove section 23 decreases. However, the connection passage 28 is opened in the second annular surface 26. As described above, the pressure in the connection passage 28 is equal to the pressure in the inlet passage 41. Therefore, when the static pressure at a region around the second annular surface 26 decreases, the working fluid is supplied to such region from the connection passage 28 to suppress the decrease in the static pressure.

By supplying the working fluid through the connection passage 28, the drop in static pressure is suppressed, the force due to static pressure on the surface of the spool 20 facing the connection passage 28 is also reduced, and the flow force in the axial direction AD is reduced. As a result, the flow force in the axial direction AD acting in the direction of closing the valve is reduced, and the override property is improved.

Figure 6A:
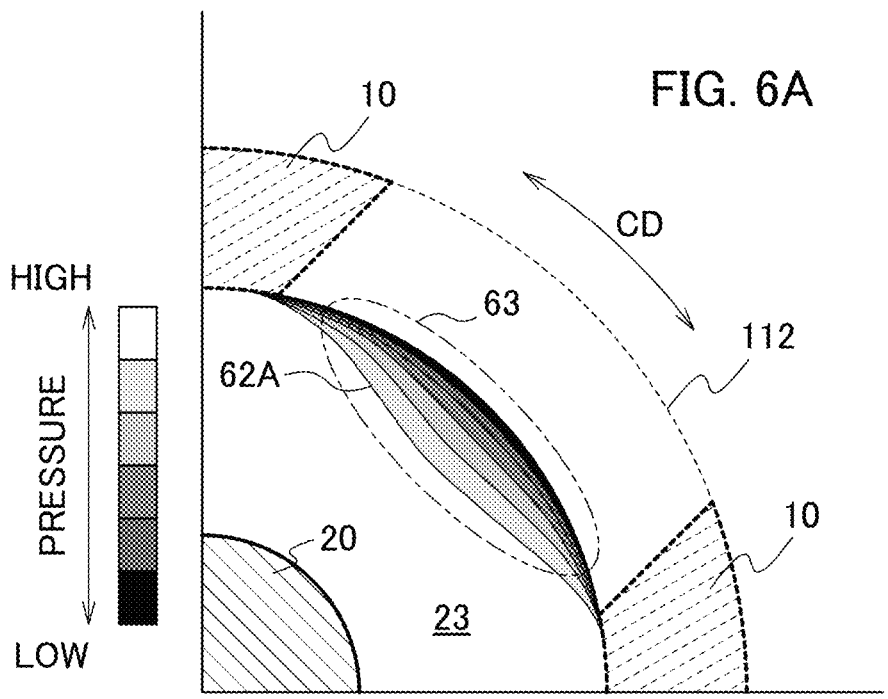
Figure 6B:
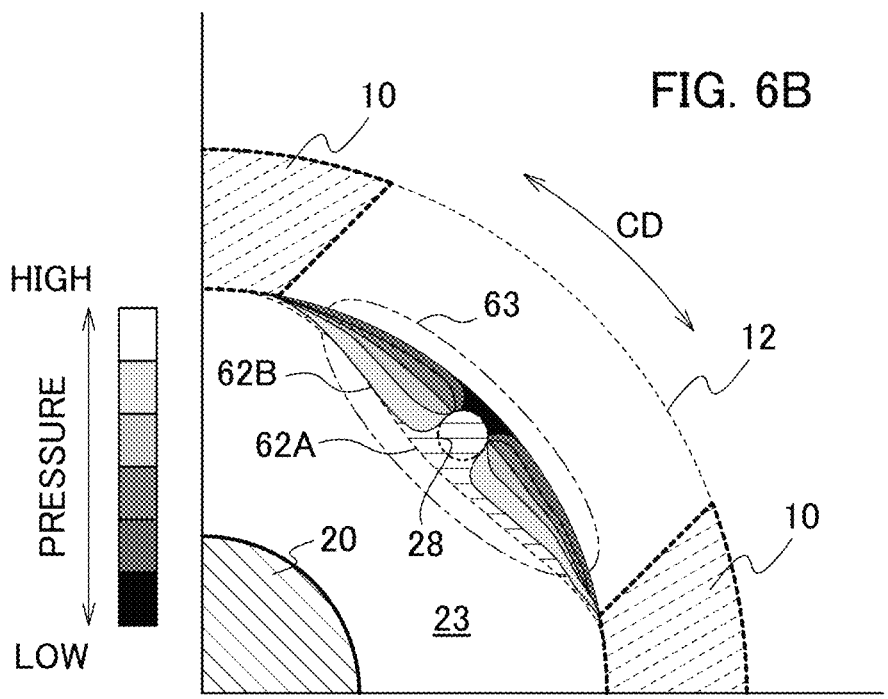

The improvement of this override property will be described. FIGS. 6A and 6B are diagrams showing numerical analysis results using Computational Fluid Dynamics (CFD) for the static pressure distribution in a groove section 23 near the outlet port on a cross section orthogonal to the axis 2. FIG. 6A shows the static pressure distribution in the comparative example, and FIG. 6B shows the static pressure distribution in the present embodiment. In both figures, the change in static pressure is represented by a color shade, and the darker the region (the darker the black), the lower the static pressure. In the comparative example shown in FIG. 6A, the connection passage 28 of the present embodiment is not formed. Except for this point, both cases assume the same configuration.

FIG. 6B shows the low-pressure region 62A shown in FIG. 6A by a hatched area and the connection passage 28 opened in the second annular surface 26 by a dotted line. Focusing on a region 63 surrounded by the two-dot chain line, it can be seen that an area of a low-pressure region 62B shown in FIG. 6B is smaller than an area of a low-pressure region 62A shown in FIG. 6A, and the region with the most significant pressure drop (i.e., the darkest region) distributed near the boundary between the groove section 23 and the outlet port 12 is smaller. That is, the static pressure drop is suppressed within the region 63.

The static pressure drop in a region means the dynamic pressure increase in the region. That is, the static pressure drop suggests the acceleration of the working fluid in the region. Therefore, the reduction of the low-pressure region 62B shown in FIG. 6B suggest a decrease in the velocity of the jet 60 of the working fluid, that is, a decrease in the flow force.

Figure 7A:
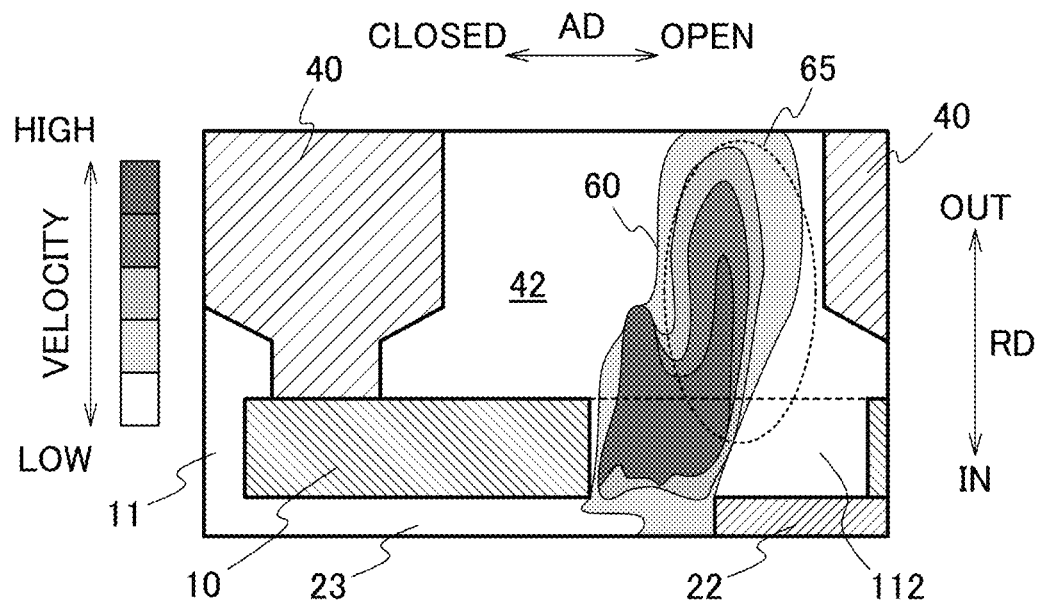
Figure 7B:
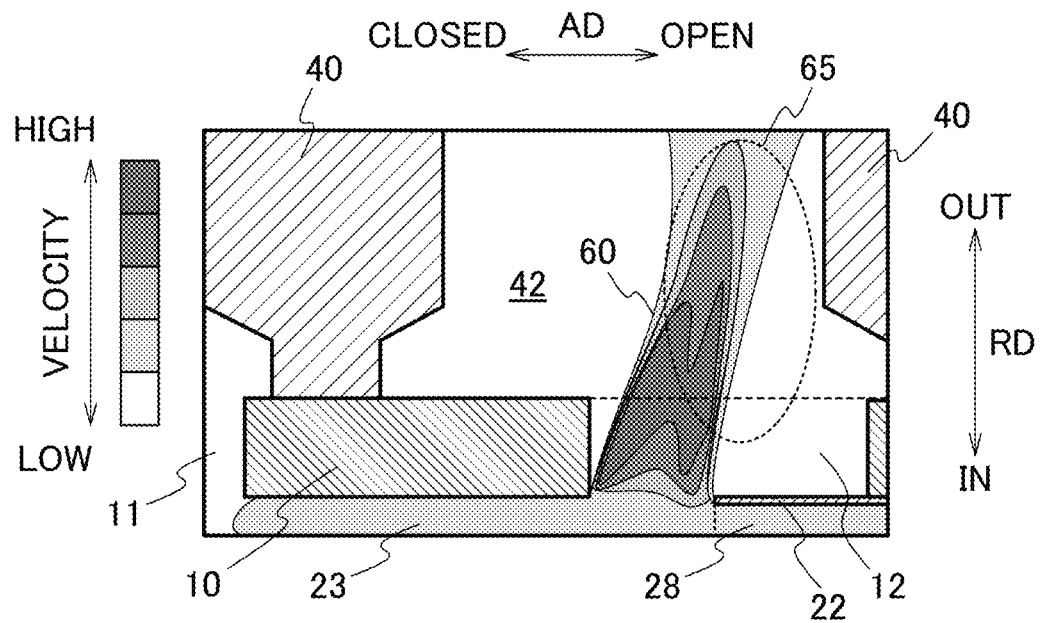

FIGS. 7A and 7B are diagrams showing numerical analysis results using CFD on a velocity distribution of the jet on the cross section including the axis 2. FIG. 7A shows the velocity distribution of the jet in the comparative example, and FIG. 7B shows the velocity distribution of the jet in the present embodiment. In the comparative example, the connection passage 28 of the present embodiment is not formed.

However, the outer shape of an outlet port 112 in the comparative example is the same as the outer shape of the outlet port 12 of the present embodiment, and the opening area of the outlet port in both analyses is set to the same value. The value is half of the opening area when the outlet port is fully opened.

As shown in FIGS. 7A and 7B, in both analysis results, the jet 60 of the working fluid flows generally outward in the radial direction, but is slightly inclined toward the opening direction of the spool valve 1 (i.e., to the right in the figure). Focusing on the region 65 at the same position surrounded by a dotted line, the jet 60 shown in FIG. 7B is thinner than the jet 60 shown in FIG. 7A. In particular, when comparing the velocity distributions in the region 65 at the same position in both figures, the flow with relatively large velocity occurs in a wide range in FIG. 7A, while the flow with similar velocity decreases in FIG. 7B, and the distribution also shrinks.

The vicinity of a boundary between the groove section 23 and the outlet port 12 is the origin of the jet of the working fluid. The velocity component of the jet 60 toward the opening direction of the spool valve 1 contributes to the flow force in the axial direction AD acting in the closing direction of the spool valve 1. Therefore, in comparison with the result of the comparative example shown in FIG. 7A, the result shown in FIG. 7B shows that among the velocity components of the jet 60, the velocity components contributing to the flow force in the axial direction AD are reduced.

Therefore, it is possible to reduce the flow force in the axial direction by providing the connection passage. That is, according to the present embodiment, it is possible to suppress the influence of the flow force on the override property of the pressure control valve or the flow control valve. That is, it is possible to improve the override property.

In addition, the reduction of the axial flow force is achieved by supplying the working fluid to the space in the groove near the outlet port through the connection passage. Therefore, there is no need to apply a local change in shape such as a recess to the inner surface of the groove of the spool. Consequently, it is possible to suppress adhesion of foreign matter in the working fluid to the groove, and maintain the original performance of the spool valve for a long time even in an environment where foreign matter is easily mixed in the working fluid.

It should be noted that the present disclosure is not limited to the embodiments described above, is shown by the description of the claims, and further includes all modifications within the meaning and scope of the same as the description of the claims.

What is claimed is:

1. A spool valve comprising:
   a sleeve extending in an axial direction thereof, including an inlet port and an outlet port for working fluid, the outlet port located rearward of the inlet port in the axial direction;
   a spool movably housed in the sleeve in the axial direction, including a tip end located forward in the axial direction and a base end located rearward of the tip end in the axial direction;
   a biasing device including a biasing member configured to press the base end of the spool toward tip end of the spool, the biasing member located rearward of the spool in the axial direction; and
   a pressure detecting port located forward of the spool in the axial direction and opening toward the tip end of the spool; wherein
   the spool includes:
      a first land section located between the pressure detecting port and the inlet port in the axial direction;
      a second land section located rearward of the first land section in the axial direction and at a position where the outlet port can be closed;
      a groove section located between the first land section and the second land section, having a width in the axial direction capable of connecting between the inlet port and outlet port;
      a recess portion formed on an outer peripheral surface of the second land section; and
      a connection passage for the working fluid formed in the second land section, connecting between the groove section and the recess portion, and
      the sleeve is formed with a path hole facing and communicating with the recess portion of the spool.

2. The spool valve according to claim 1, wherein the path hole extends in a radial direction of the sleeve.

3. A spool valve comprising:
   a sleeve extending in an axial direction thereof, including an inlet port and an outlet port for working fluid, the outlet port located rearward of the inlet port in the axial direction;
   a spool movably housed in the sleeve in the axial direction, including a tip end located forward in the axial direction and a base end located rearward of the tip end in the axial direction;
   a biasing device including a spring configured to press the base end of the spool toward the tip end of the spool, the spring located rearward of the spool in the axial direction; and
   a pressure detecting port located forward of the spool in the axial direction and opening toward the tip end of the spool; wherein
   the spool includes:
      a first land section located between the pressure detecting port and the inlet port in the axial direction;
      a second land section located rearward of the first land section in the axial direction and at a position where the outlet port can be closed;
      a groove section located between the first land section and the second land section, having a width in the axial direction capable of connecting between the inlet port and outlet port;
      a recess portion formed on an outer peripheral surface of the second land section; and
      a connection passage for the working fluid formed in the second land section, connecting between the groove section and the recess portion, and
      the sleeve is formed with a path hole facing and communicated with the recess portion of the spool.

4. The spool valve according to claim 3, wherein the path hole extends in a radial direction of the sleeve.

* * * * *